United States Patent
Hsueh

(10) Patent No.: US 9,577,853 B1
(45) Date of Patent: Feb. 21, 2017

(54) CURRENT BALANCE METHOD AND CURRENT BALANCE CIRCUIT THEREOF

(71) Applicant: ANPEC ELECTRONICS CORPORATION, Hsinchu (TW)

(72) Inventor: Wei-Chieh Hsueh, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 14/932,994

(22) Filed: Nov. 5, 2015

(30) Foreign Application Priority Data

Aug. 10, 2015 (TW) .............................. 104125932 A

(51) Int. Cl.
*H03K 7/08* (2006.01)
*H04L 25/49* (2006.01)
*H04B 1/04* (2006.01)

(52) U.S. Cl.
CPC ............. *H04L 25/4902* (2013.01); *H04B 1/04* (2013.01)

(58) Field of Classification Search
CPC ............................ H03K 7/08; H04L 25/4902
USPC ......................................................... 375/238
See application file for complete search history.

(56) References Cited

U.S. PATENT DOCUMENTS

| | | | | |
|---|---|---|---|---|
| 4,599,686 A * | 7/1986 | Muller | ............... | H02M 7/53875 363/132 |
| 4,626,763 A * | 12/1986 | Edwards | ................. | H02P 27/08 318/811 |
| 2013/0293203 A1* | 11/2013 | Chen | ..................... | H02M 1/084 323/234 |

* cited by examiner

*Primary Examiner* — Helene Tayong
(74) *Attorney, Agent, or Firm* — Li & Cai Intellectual Property (USA) Office

(57) ABSTRACT

The present disclosure illustrates a current balance method and a current balance circuit thereof. The current balance method is used in a multiphase digital pulse width modulator. Steps of the current balance method are as follows. A plurality of pulse width values of the pulse width modulated signals within a first period are recorded, and a minimum pulse width value is defined as a standard value. The method determines whether each pulse width value is larger than the sum of the standard value and a pulse width threshold, and if yes, the method adds 1 to a count value of the phase output stage corresponding to the pulse width value. The method determines whether each count value equals to a counting threshold, and if yes, the method adjusts the pulse width modulated signal, and initializing the count value as 0.

6 Claims, 4 Drawing Sheets

US 9,577,853 B1

CURRENT BALANCE METHOD AND CURRENT BALANCE CIRCUIT THEREOF

BACKGROUND OF THE INVENTION

1. Field of the Invention

The instant disclosure relates to a current balance method and a current balance circuit; in particular, to a current balance method and a current balance circuit used in a multiphase digital pulse width modulator.

2. Description of Related Art

In recent years, the digital pulse width modulation technology has been widely used in the power management integrated circuit. Compared with the analog pulse width modulation technology, the digital pulse width modulation technology has lower cost and better features for controlling, which has made the digital pulse width modulation technology become main stream in the power control field in a short time.

On the other hand, compared with the traditional digital pulse width modulator with signal channel, the multiphase digital pulse width modulator has a plurality of parallel channels which can distribute the provided currents to each channel evenly. However, as the currents within the channels lose balance (for example, the current in certain channel is more than the currents in other channels), thermal runaway would happen and that channel would be thus burned. Therefore, there is still a current balance method needed to be used in the traditional multiphase digital pulse width modulator to make the currents distribute to each channel evenly so as to avoid the unbalance.

The current balance technology traditionally and commonly used in the traditional multiphase digital pulse width modulator is to detect the current of each phase and to calculate an average, so as to adjust the pulse width regarding to each phase. However, there is one analog to digital converter (ADC) needed for each phase to detect the current, which makes the analog to digital converter which has high converting rate and high transmission speed become rather important in the above traditional current balance method. Moreover, the above traditional current balance method has its working complexity.

SUMMARY OF THE INVENTION

The instant disclosure provides a current balance method, used in a multiphase digital pulse width modulator, wherein the digital pulse width modulator periodically outputs M pulse width modulated signals to M phase output stages of the digital pulse width modulator respectively and M is a positive integer greater than or equal to 2, and the current balance method comprising: (A) recording a pulse width value of the pulse width modulated signal output into each phase output stage within a first period of the digital pulse width modulator, and obtaining the minimum pulse width value among the pulse width values as a standard value; (B) respectively determining whether the pulse width value of each phase output stage is larger than the sum of the standard value and a pulse width threshold, and adding 1 to a count value of the phase output stage corresponding to the pulse width value, if the pulse width value of each phase output stage is larger than the sum of the standard value and a pulse width threshold; and (C) respectively determining whether the count value of each phase output stage equals to a counting threshold, adjusting the pulse width modulated signal, output to the phase output stage corresponding to the count value within a second period by the digital pulse width modulator, if the count value of each phase output stage equals to the counting threshold, and initializing the count value as 0.

The instant disclosure further provides a current balance circuit used to provide a current balance operation in a multiphase digital pulse width modulator. The digital pulse width modulator periodically outputs M pulse width modulated signals to M phase output stages of the digital pulse width modulator respectively, and M is a positive integer greater than or equal to 2. The current balance circuit comprises a recording and comparing unit, a first operation processing unit and a second operation processing unit. The recording and comparing unit records a pulse width value of the pulse width modulated signal output to each phase output stage within a first period of the digital pulse width modulator, and obtains the minimum pulse width value among the pulse width values as a standard value. The first operation processing unit respectively determines whether the pulse width value of each phase output stage is larger than the sum of the standard value and a pulse width threshold, and adds 1 to a count value of the phase output stage corresponding to the pulse width value, if the pulse width value of each phase output stage is larger than the sum of the standard value and a pulse width threshold. The second operation processing unit respectively determines whether the count value of each phase output stage equals to a counting threshold, adjusts the pulse width modulated signal output to the phase output stage corresponding to the count value within a second period by the digital pulse width modulator, if the count value of each phase output stage equals to the counting threshold, and initializes the count value as 0.

To sum up, the current balance method and a circuit using the same does not need to adjust the signal pulse width of each phase output stage via the current detection of the analog to digital converter. Thereby, the difficulties resulting from using the analog to digital converter can be solved and the circuit size and circuit cost can be further reduced. The current unbalance is overcome in an all-digital way such that the precision for balance control and the reliability can be improved and the faster reaction rate can be obtained.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
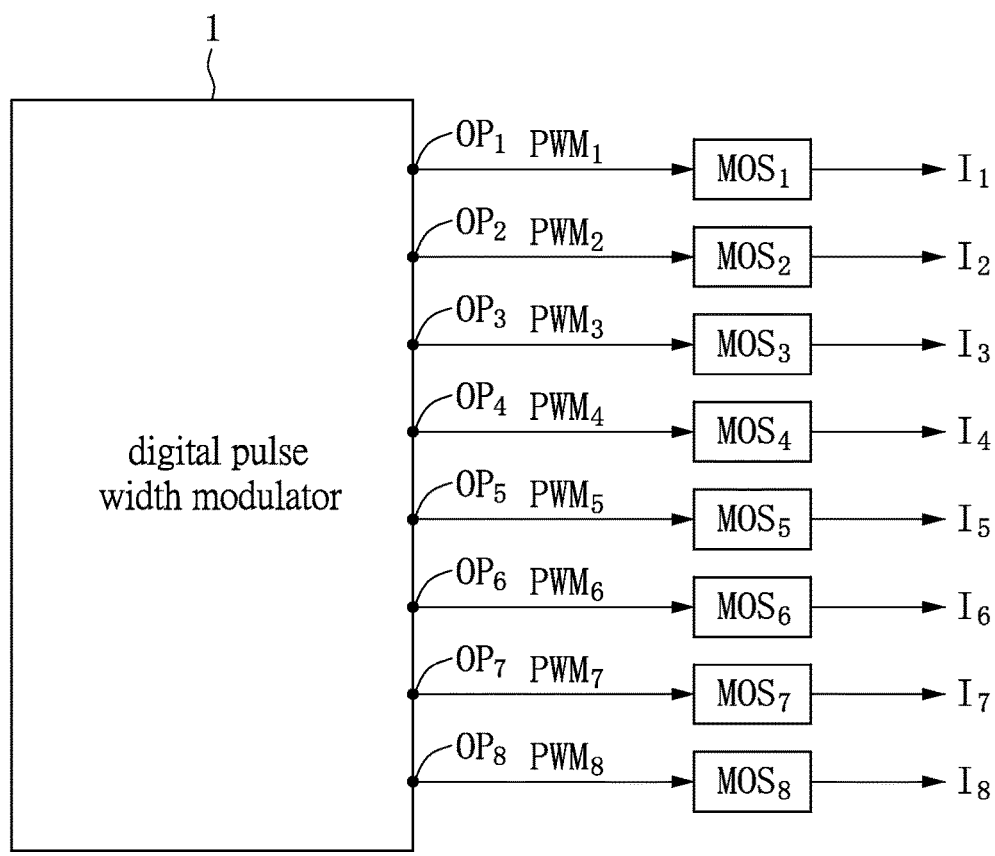
FIG. 1 shows a schematic diagram of an eight-phase digital pulse width modulator of one embodiment of the instant disclosure.

In the following description, the eight-phase digital pulse width modulator drawn in FIG. 1 is taken for example for illustration. The digital pulse width modulator 1 periodically and orderly provides eight pulse width modulated signals PWM1~PWM8 to eight phase output stages OP1~OP8 respectively to turn on or off the MOSFET switches MOS1~MOS8 which are connected to the digital pulse width modulator 1, such that currents having eight phases I1~I8 are respectively provided. It is worth mentioning that, the embodiment shown in FIG. 1 is for illustrating the instant disclosure; however, the phase number thereof is not a restriction for the instant disclosure. In other words, the current balance method provided by the instant disclosure can be applied to the M-phase digital pulse width modulator, wherein M is a positive integer equal to or greater than 2.

Specifically speaking, the currents I1~I8 having different phases may lose balance because the elements having different phases do not match with each other, such that the generated heat and power would not be uniform and the system efficiency and reliability would further decrease. To solve the unbalance for the currents I1~I8, there must be at least one analog to digital converter (not shown) added in the prior art to detect the currents I1~I8 having different phases, such that the duty cycle of each pulse width modulated signal PWM1~PWM8 can be adjusted to make the currents I1~I8 be balanced.

There is a dilemma in the prior art. For example, if better precision and reliability are required, there must be an analog to digital converter having more bits and higher converting rate, which increases the circuit size and circuit cost. On the contrary, if an analog to digital converter having less bits and lower converting rate is used to reduce the circuit size and circuit cost, the precision and reliability of balance control would decrease. This results in the defects of the prior art.

Thus, the working principle of the current balance method provided by the instant disclosure is that, there is no need to adjust the signal pulse width of each phase output stage via the current detection of the analog to digital converter. Thereby, the difficulties resulting from using the analog to digital converter can be solved and the circuit size and circuit cost can be further reduced. Additionally, according to the above, those skilled in the art should be able to understand that, to control each MOSET switch MOS1~MOS8 to obtain the needed currents, adjust the duty cycle of each pulse width modulated signal PWM1~PWM8.

Figure 2:
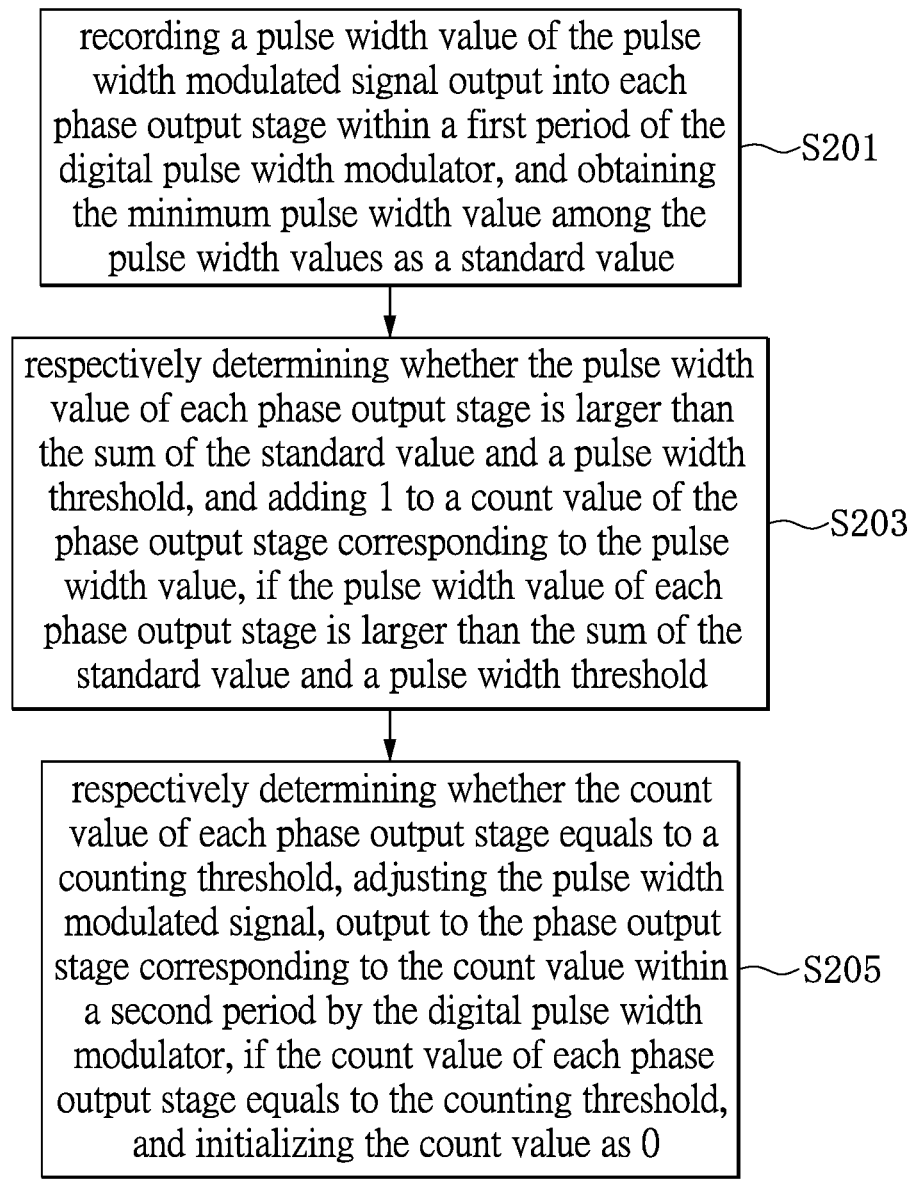
FIG. 2 shows a flow chart of a current balance method of one embodiment of the instant disclosure.

Thus, please refer to FIG. 2. FIG. 2 shows a flow chart of a current balance method of one embodiment of the instant disclosure. The current balance method of the present embodiment may be conducted in the digital pulse width modulator shown in FIG. 1 and thus please refer to FIG. 1 for further understanding.

In the step S201, a pulse width value of the pulse width modulated signal PWM1~PWM8 output into each phase output stage OP1~OP8 is recorded within a first period of the digital pulse width modulator 1. (That is, the pulse width value DMi represents for the duration of the duty cycle of each pulse width modulated signal PWM1~PWM8 within the first period, wherein in this embodiment i can be one of 1~8.) After that, the minimum pulse width value among the pulse width values DM1~DM8 is found and taken as a standard value.

In the step S203, whether the pulse width value of each phase output stage is larger than the sum of the standard value and a pulse width threshold is respectively determined. A count value of the phase output stage corresponding to the pulse width value would be added by 1, if the pulse width value of each phase output stage is larger than the sum of the standard value and a pulse width threshold.

Finally, in the step S205, whether the count value CNT1~CNT8 of each phase output stage OP1~OP8 equals to a counting threshold is respectively determined. The pulse width modulated signal PWMj output to the phase output stage OPj corresponding to the count value CNTj within a second period by the digital pulse width modulator 1 would be adjusted, if the count value CNTj equals to the counting threshold (in this embodiment, j can also be one of 1~8), and the count value CNTj would be initialized as 0.

Thus, the above steps S201~S205 are supposed to be finished within the same period corresponding to the digital pulse width modulator 1. In other words, the skilled in the art should understand that, in the next period, when the digital pulse width modulator 1 orderly provides new pulse width modulated signals PWM1~PWM8 respectively to the phase output stages OP1~OP8, the steps S201~205 need to be conducted again. Moreover, the computation for the pulse widths of each pulse width modulated signal pulse width modulated signal is not restricted in the instant disclosure, and those skilled in the art can design it depending on need.

In addition, in the step S203, the count value CNTi of the phase output stage OPi corresponding to the pulse width value DMi would not be added by 1, if the pulse width value DMi of each phase output stage is not larger than the sum of the standard value and the pulse width threshold. Briefly speaking, the purpose of step S203 is to compare the duty cycles of each pulse width modulated signal PWM1~PWM8 within the same duty cycle to respectively update the count values CNT1~CNT8 corresponding to each phase output stage OP1~OP8; however, the detailed implementation of the step S203 is not restricted herein.

For example, in the step S203, another implementation is to respectively determine whether the pulse width value DM1~DM8 of each phase output stage OP1~OP8 is greater than a certain multiple of the standard value. For example, if the multiple rate is 1.25, to determine whether the pulse width value DM1~DM8 of each phase output stage OP1~OP8 is greater than the standard value multiplied by 1.25. If yes, this count value CNTi of this phase output stage OPi corresponding to this pulse width value DMi would be added by 1

According to the above, based on the above, those skilled in the art would understand that, within the same period, the currents I1~I8 provided by the phase output stages OP1~OP8 would be different according to the duty cycles of the pulse width modulated signals PWM1~PWM8. Precisely speaking, a larger current Ii can be provided by the pulse width modulated signal PWMi having a longer duty cycle. The pulse width modulated signal PWMi having a longer duty cycle would have a larger pulse width value DMi.

Moreover, the current I1~I8 provided by each phase output stage OP1~OP8 is accumulated according to the duty cycle of each pulse width modulated signal PWM1~PWM8. Thus, the purpose of the step S205 is to find the phase output stage OPj which has a current Ij extremely larger than an average within the current period via the updated count value CNT1~CNT8 of each phase output stage OP1~OP8, and to determine to adjust the pulse width modulated signal PWMj of this phase output stage OPj in the next period.

Thereby, the current Ij of this phase output stage OPj would decrease in the next period and not diverge, which prevents the current unbalance. However, detailed implementation to adjust the pulse width modulated signal PWMj in the next period is not restricted herein, and those skilled in the art can design depending on need. Moreover, in the step S205, initializing the count value CNTj as 0 can make the count value CNTj of the phase output stage OPj count again from 0 to avoid the complexity of setting parameters.

Figure 3:
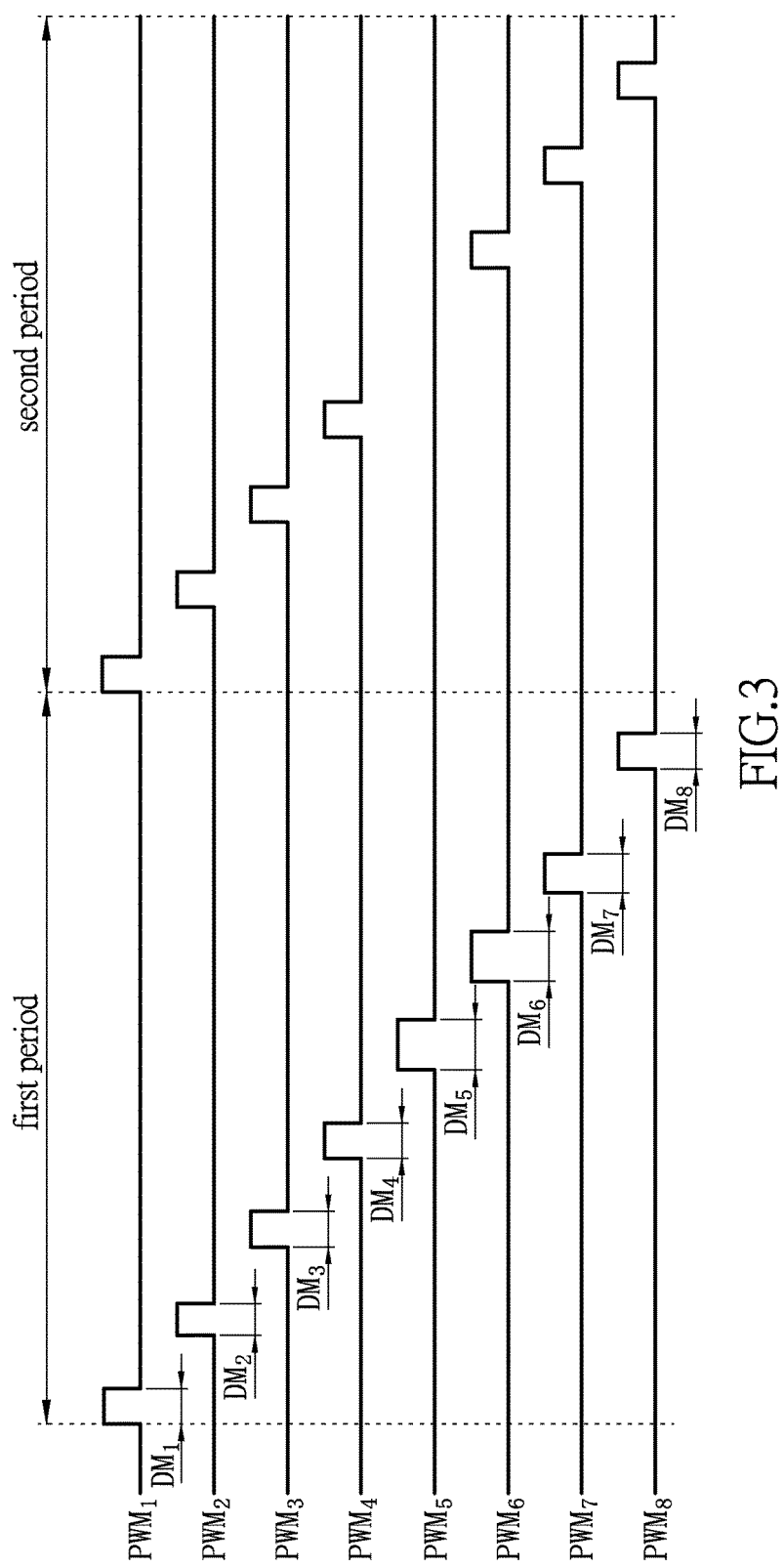
FIG. 3 shows a waveform diagram of the operation process of a current balance method of one embodiment of the instant disclosure.

In order to further illustrate the detailed implementation of the current balance method, the waveform diagram of the operation process is provided in the following description. Please refer to FIG. 3. FIG. 3 shows a waveform diagram of the operation process of a current balance method of one embodiment of the instant disclosure. In addition, the method of the present embodiment may be conducted in the digital pulse width modulator 1 shown in FIG. 1, and thus please refer to FIGS. 1-2 for further understanding. The following is one of embodiments of the current balance method provided by the instant disclosure, and it is not limited herein.

For example, within the first period, the pulse width value DM1~DM8 of the pulse width modulated signal PWM1~PWM8 of each phase output stage OP1~OP8 is recorded as 49, 48, 49, 49, 53, 53, 50 and 49. Thus, in the step S201, the minimum pulse width value "48" is found as the standard value among the pulse width values DM1~DMB. After that, taking an example where the pulse width threshold is set as 3, in the step S203, it is determined that, there are the pulse width values DM5 and DM6 of the phase output stages OP5 and OP6 which are greater than the sum of the standard value and the pulse width threshold, which is 51 (48+3=51). Thus, the count values CNT5 and CNT 6 of the phase output stages OP5 and OP6 are respectively added by 1.

After the step S203, the count values CNT1~CNT8 of the phase output stages OP1~OP8 are respectively 3, 4, 7, 7, 15, 13, 7 and 7. Therefore, if taking the example of which the counting threshold is set as 15, in the step S205, it is determined that only the count value CNT5 of the phase output stage OP5 equal to the counting threshold. Thereby, it could be known that in the current period the current I5 is extremely larger than the average.

In order to avoid the divergence of the current I5 of the phase output stage OP5 to make a worse current unbalance, in the step S205, it can be determined to adjust the pulse width modulated signal PWM5 which is output to the phase output stage OP5 by the digital pulse width modulator 1 in the second period, and to initialize the count value CNT5 as 0.

In order to further illustrate the means to adjust the pulse width modulated signal PWM5 within the second period, there are several implementations provided in the following description; however, it is not limited herein.

For example, as the count value CNT5 equals to the counting threshold "15", a masking signal would be output to the digital pulse width modulator 1, such that the pulse width modulated signal PWM5 output to the pulse width modulated signal OP5 corresponding to the count value CNT5 would be 0, as shown in FIG. 3. In other words, the masking signal makes the digital pulse width modulator 1 unable to efficiently provide the pulse width modulated signal PWM5 to the MOSFET switch MOSS within the second period and further unable to provide the current I5. In this way, the divergence of the current I5 is avoided and there is no worsening of the current unbalance. It is worth mentioning that, the working principle regarding to the masking signal is well-known by those skilled in the art and the detailed implementation of the masking signal is not restricted in the instant disclosure, so those skilled in the art can design it depending on need.

According to the above disclosure, it should be understood that, once the divergence of the current I5 can be efficiently reduced, the following current unbalance can be avoided. Thus, in the following description, there is another embodiment provided to illustrate the means for adjusting the pulse width modulated signal PWM5 within the second period.

For example, as the count value CNT 5 equals to the counting threshold "15", within the second of the digital pulse width modulator 1, the digital pulse width modulator 1 is controlled to decrease the duty cycle of the pulse width modulated signal PWM5 output to the phase output stage OP5 corresponding to the count value CNT5, so as to decrease the pulse width value PWM5 of the phase output stage OP5 within the second period. In this situation, the current I5 in the next period needs not to be entirely masked, but the divergence of the current I5 and the current unbalance can still be avoided. It is worth mentioning that, the decrease of duty cycle of the pulse width modulated signal PWM5 is not limited in the instant disclosure, and those skilled in the art can design depending on need. Briefly speaking, the above implementations are for illustrating but not to restricting the instant disclosure.

Figure 4:
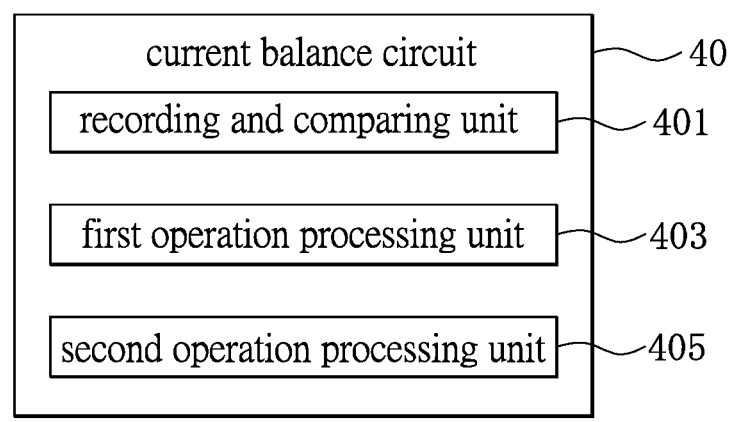
FIG. 4 shows a block diagram of a motor current balance circuit of other embodiments of the instant disclosure.

In order to further illustrate the operation process of the current balance method, there is a current balance circuit further provided by the instant disclosure. Please refer to FIG. 4. FIG. 4 shows a block diagram of a motor current balance circuit of another embodiment of the instant disclosure. However, the following current balance circuit 40 is taken as one of embodiments of the instant disclosure but not taken as a limitation.

In detail, the current balance circuit 40 comprises a recording and comparing unit 401, a first operation processing unit 403 and a second operation processing unit 405. Each unit above can be implemented via hardware circuits or the combination of hardware circuits and the firmware circuits. In brief, the implementation of the current balance circuit 40 is not limited by the instant disclosure. In addition, the recording and comparing unit 401, the first operation processing unit 403 and the second operation processing unit 405 can be set separately or configured integrally, which is not limited herein.

The recording and comparing unit 401 is configured to record the pulse width value of the pulse width modulated signal output to each phase output stage within the first and second periods of the digital pulse width modulator, and further to find the minimum pulse width value among the pulse width values as the standard value.

The first operation processing unit 403 is configured to determine whether the pulse width value of each phase output stage is greater than the sum of the standard value and the pulse width threshold, and to determine to make the count value of this phase output stage corresponding to this pulse width value added by 1.

The second operation processing unit 405 is configured to respectively determine whether the count value of each phase output stage equals to the counting threshold. If the count value of each phase output stage equals to the counting threshold, the second operation processing unit 405 adjusts the pulse width modulated signal output to the phase output stage corresponding to the count value within the second period, and initializes the count value as 0.

It is worth mentioning that, the current balance circuit of the present embodiment may be implemented with the digital pulse width modulator 1 shown in FIG. 1, and please refer to FIG. 1 for further understanding and the details are thus omitted herein.

To sum up, the current balance method and a circuit using the same does not need to adjust the signal pulse width of each phase output stage via the current detection of the analog to digital converter. Thereby, the difficulties resulting from using the analog to digital converter can be solved and the circuit size and circuit cost can be further reduced. The current unbalance is overcome in an all-digital way such that the precision for balance control and the reliability can be improved and the faster reaction rate can be obtained.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A current balance method for avoiding an output current of a multiphase digital pulse width modulator to diverge, wherein the multiphase digital pulse width modulator periodically outputs M pulse width modulated signals to M phase output stages of the multiphase digital pulse width modulator respectively and M is a positive integer greater than or equal to 2, and the current balance method comprising:
    (A) recording, by a recording and comparing circuit, a pulse width value of the pulse width modulated signal output into each phase output stage within a first period of the multiphase digital pulse width modulator, and obtaining a minimum pulse width value among the pulse width values as a standard value;
    (B) respectively determining, by a first operation processing circuit, whether the pulse width value of each phase output stage is larger than a sum of the standard value and a pulse width threshold, and adding 1 to a count value of the phase output stage corresponding to the pulse width value, if the pulse width value of each phase output stage is larger than the sum of the standard value and the pulse width threshold; and
    (C) respectively determining, by a second operation processing circuit, whether the count value of each phase output stage equals to a counting threshold, adjusting the pulse width modulated signal, output to the phase output stage corresponding to the count value within a second period by the multiphase digital pulse width modulator, if the count value of each phase output stage equals to the counting threshold, and initializing the count value as 0;
    wherein in the step (B), determining not to add 1 to the count value of the phase output stage corresponding to the pulse width value, if the pulse width value of each phase output stage is not larger than the sum of the standard value and the pulse width threshold;
    wherein in the step (C), determining not to adjust the pulse width modulated signal output to the phase output stage corresponding to the count value within a second period by the multiphase digital pulse width modulator, if the count value of each phase output stage is not equal to the counting threshold.

2. The current balance method according to claim 1, further comprising:
    outputting a masking signal to make the pulse width modulated signal output to the phase output stage corresponding to the count value within a second period by the multiphase digital pulse width modulator be 0, if the count value equals to the counting threshold.

3. The current balance method according to claim 1, further comprising:
    controlling the multiphase digital pulse width modulator to shorten the duty cycle of the pulse output to the phase output stage corresponding to the count value width modulated signal within the second period of the multiphase digital pulse width modulator so as to decrease the pulse width value of the phase output stage in the second period, if the count value equals to the counting threshold.

4. A current balance circuit for avoiding an output current of a multiphase digital pulse width modulator to diverge, wherein the multiphase digital pulse width modulator periodically outputs M pulse width modulated signals to M phase output stages of the multiphase digital pulse width modulator respectively and M is a positive integer greater than or equal to 2, and the current balance circuit comprising:
    a recording and comparing circuit, recording a pulse width value of the pulse width modulated signal output to each phase output stage within a first period of the multiphase digital pulse width modulator, and obtaining a minimum pulse width value among the pulse width values as a standard value;
    a first operation processing circuit, respectively determining whether the pulse width value of each phase output stage is larger than a sum of the standard value and a pulse width threshold, and adding 1 to a count value of the phase output stage corresponding to the pulse width value, if the pulse width value of each phase output stage is larger than the sum of the standard value and the pulse width threshold; and
    a second operation processing circuit, respectively determining whether the count value of each phase output stage equals to a counting threshold, adjusting the pulse width modulated signal output to the phase output stage corresponding to the count value within a second period by the multiphase digital pulse width modulator, if the count value of each phase output stage equals to the counting threshold, and initializing the count value as 0;
    wherein the first operation processing circuit determines not to add 1 to the count value of the phase output stage corresponding to the pulse width value, if the pulse width value of each phase output stage is not larger than the sum of the standard value and the pulse width threshold;
    wherein the second operation processing circuit determines not to adjust the pulse width modulated signal output to the phase output stage corresponding to the count value within a second period by the multiphase digital pulse width modulator, if the count value of each phase output stage is not equal to the counting threshold.

5. The current balance circuit according to claim 4, wherein the current balance circuit outputs a masking signal to make the pulse width modulated signal output to the phase output stage corresponding to the count value within a second period by the multiphase digital pulse width modulator be 0, if the count value equals to the counting threshold.

6. The current balance circuit according to claim 4, wherein the current balance circuit controls the multiphase digital pulse width modulator to the shorten the duty cycle of the pulse output to the phase output stage corresponding to the count value width modulated signal within the second period of the multiphase digital pulse width modulator so as to decrease the pulse width value of the phase output stage in the second period, if the count value equals to the counting threshold.

* * * * *